United States Patent [19]
Lieberman et al.

[11] Patent Number: 5,133,055
[45] Date of Patent: Jul. 21, 1992

[54] SIGNAL PROCESSOR FOR PERSONAL COMPUTERS

[75] Inventors: David E. Lieberman, Milpitas; G. Mark Remelman, Fremont, both of Calif.

[73] Assignee: Physio Systems, Inc., Fremont, Calif.

[21] Appl. No.: 464,886

[22] Filed: Jan. 16, 1990

[51] Int. Cl.⁵ .......................... G06F 3/00; G06F 3/14; G06F 15/34

[52] U.S. Cl. ........................ 395/275; 364/238.3; 364/238.2; 364/239.9; 364/260.1; 364/926; 364/926.6; 364/927 Z

[58] Field of Search ................. 364/200, 900

[56] References Cited

U.S. PATENT DOCUMENTS

| | | | |
|---|---|---|---|
| Re. 31,750 | 11/1984 | Morrow | 364/550 |
| 3,532,861 | 10/1970 | Bauman et al. | |
| 3,648,032 | 3/1972 | Gineste | |
| 4,061,904 | 12/1977 | Hannauer et al. | |
| 4,454,500 | 6/1984 | Kato et al. | |
| 4,484,295 | 11/1984 | Bedard et al. | |
| 4,636,939 | 1/1987 | Fildes | |
| 4,716,542 | 12/1987 | Peltz et al. | 364/900 |
| 4,789,961 | 12/1988 | Tindall | |
| 4,812,847 | 3/1989 | Stewart et al. | |
| 4,819,149 | 4/1989 | Sanik et al. | 364/200 |
| 4,839,802 | 6/1989 | Wonak et al. | 364/200 |
| 4,942,877 | 7/1990 | Sakai et al. | 356/41 |
| 4,945,410 | 7/1990 | Walling | 358/141 |
| 4,956,788 | 9/1990 | Guan et al. | 364/900 |
| 4,961,117 | 10/1990 | Rumley | 358/461 |

Primary Examiner—Michael R. Fleming
Assistant Examiner—Robert S. Hauser
Attorney, Agent, or Firm—Kolisch, Hartwell, Dickinson, McCormack & Heuser

[57] ABSTRACT

An external signal processor is provided for use with a personal computer. The signal processor incorporates hardware components for receiving external analog or frequency signals and for converting the signals to digital form for retrieval by the computer in nibble mode. Interconnection with the personal computer is through the parallel printer port, with the signal processor installed between the computer and an external printer. Normal printer functions are available when a transparent mode is enabled. The signal processor can also monitor one or more external digital signals and output one or more digital control signals. An example of programmable control software is also provided.

24 Claims, 1 Drawing Sheet

FIG. 1

SIGNAL PROCESSOR FOR PERSONAL COMPUTERS

BACKGROUND AND SUMMARY OF THE INVENTION

The present invention relates generally to analog-to-digital converters for use with personal computers and more particularly to a self-contained signal processor device which is designed for connection to a personal computer through the parallel printer port.

The ability to monitor, record and respond to analog signals is valuable in many engineering, manufacturing, medical and control applications in which personal computers are also employed. The market for analog signal processors has led personal computer manufacturers and others to make analog-to-digital (A/D) chips or cards which can be installed within the frame of a personal computer. In such prior art A/D converter options, the cover of the computer is removed, a card is plugged into the PC bus and the personal computer operating software is modified to acquire and convert analog signals to digital form for processing. Alternatively, various dedicated analog signal acquisition, transfer and storage devices are available which can transfer A/D converted data to a computer via disk, modem or another means of serial communication.

Disadvantages of prior art systems for enabling personal computers to monitor analog signals include the inconvenience of having to open the personal computer and install the necessary chip or card, the cost of such cards and the technical expertise required by someone setting up the computer to process analog signals. High resolution analog-to-digital conversion cards, capable of twelve-bit or more resolution, generally cost over a thousand dollars. Many owners of personal computers are discouraged from installing analog monitoring capability by these obstacles.

There is a need, therefore, for a simpler, less expensive add-on device for personal computers which can be used by non-experts to accomplish high-resolution analog monitoring functions. In particular, there is a need for an easily installed analog-to-digital converter which can be programmed through a personal computer and which will respond both to instructions from the personal computer and to the analog signal being monitored. Personal computer owners also would benefit from the ability to directly monitor other external signals such as frequency signals and digital status signals and to initiate commands to external equipment. That would allow the computer to monitor the status of home or office equipment, record external system parameters and control or adjust external devices. Dedicated devices are often available to perform such tasks and computers are able to be adapted for such purposes, but no device has heretofore been available to readily expand a personal computer to perform monitoring and control functions by means of a self-contained plug-in device.

It is an object of the present invention to provide a self-contained signal processing means for connection between a parallel printer port of a personal computer and a printer which allows the personal computer to monitor external signals such as analog and frequency signals without the requirement that the computer be physically opened and additional circuitry and devices be installed.

It is another object of the invention to provide such a signal processing means which is capable of digitizing analog signals for ready retrieval by a personal computer through the parallel printer port.

It is another object of the invention to provide such a signal processor which can monitor external digital status signals and output digital control signals in response to program instructions from the personal computer.

Accordingly, a signal processing means is provided in accordance with the present invention for connection between a parallel printer port of a personal computer and a printer. The signal processor comprises a first data buffer in which data is stored, means responsive to an external signal for producing data containing information about the external signal and for transferring the data into the first data buffer. In the illustrative embodiment described below, the means responsive to an external signal is an voltage-to-frequency converter responsive to an external analog voltage signal. The signal processor further comprises a printer control means which interconnects the parallel printer port of the personal computer to an external printer when in a transparent mode and selectively blocks the connection to the external printer when in a nontransparent mode. Logic control means are also provided, coupled to the personal computer through the parallel printer port and responsive to instructions from the personal computer, for controlling the signal processing means. Instructions from the personal computer carried out by the logic control means include selectively enabling the transparent and nontransparent modes of the printer control means and transmitting data from the first buffer, which in the illustrative embodiment is the digitized analog signal, to the personal computer through the parallel printer port.

Additional functions carried out by the preferred embodiment of the signal processing means of the present invention include the monitoring of external digital status signals, which are transferred to the personal computer, and the outputting of digital control signals in response to instructions from the personal computer. The analog signal processor can incorporate either voltage-to-frequency or analog-to-digital converters as the analog monitoring device, depending on the speed requirements of the user and cost considerations.

DETAILED DESCRIPTION OF THE PREFERRED EMBODIMENT

Figure 1:
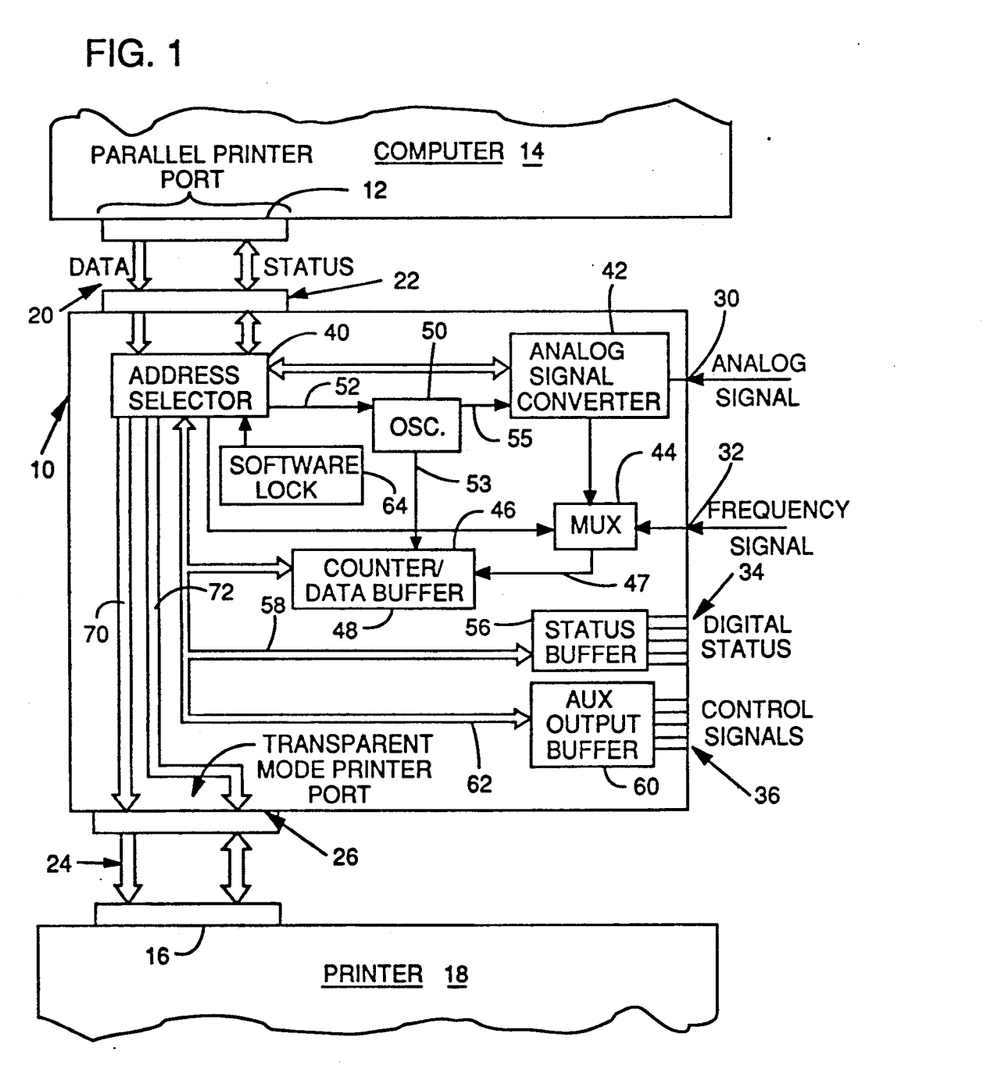
FIG. 1 is a block diagram of an analog signal processor according to the present invention, additionally showing suitable interconnections between the analog signal processor, a personal computer and a printer.

Referring to FIG. 1, the analog signal processor 10 of the present invention is a signal processing means for connection between a parallel printer port 12 of a personal computer 14 and the input port 16 of an external printer 18. A suitable printer port extension cable 20, which connects to the requisite pins employed in parallel printer port 12, is used to interconnect the computer to processor 10 at a compatible computer interconnect port 22 on processor 10. Similarly, another suitable port extension cable 24 interconnects pins on printer input port 16 to a compatible set of pins on a printer interconnect port 26 of signal processor 10. A port extension cable which can be used as cables 20 and 24 bears the International Business Machines, Inc. (IBM) designation DB25 to DB25.

Additional interconnect ports on analog signal processor 10 for connection of the device to external signals or equipment include analog signal port 30 for receiving an external analog signal, frequency input port 32, also referred to as the frequency input means, through which frequency signals are monitored, digital status port 34 through which one or more external digital status signals are monitored and control signals output port 36 through which one or more output control signals for controlling external equipment are ported.

FIG. 1 also includes a schematic representation of the internal circuitry of signal processor 10. The various boxes which represent devices or components will first be identified and described. Box 40 is a logic controller which serves as and includes an address selector. Address selector 40, among other functions, includes means for addressing discrete components within signal processor 10 and for transmitting commands from computer 14 to the addressed components. It does so by selectively interconnecting pins of computer interconnect port 22 to the various internal components of signal processor 10 in response to predetermined address codes, as is more fully described below. Box 40 is shown directly coupled to personal computer 14 through computer access port 22, parallel port extension cable line 20 and the computer parallel printer port 12. The parallel printer port 12 and interconnections thereto are schematically represented by Data and Status bus lines 20, the data line (single arrow) transmitting from computer 14 and status line (double arrow) receiving and transmitting printer commands and signals, as is well known in the art.

Box 42 is an analog signal converter 42 which is any suitable type of analog-to-digital (A/D) converter for converting to digital form an external analog signal received at analog signal input port 30. The output of converter 42 is carried on line 43 and termed the first digital signal. In the preferred embodiment, analog signal converter 42 is a voltage-to-frequency converter (V/F or V to F) such as model No. AD652, manufactured by Analog Devices. Analog signal converter 42 is also referred to as a means responsive to an external signal for producing data containing information about the external signal or as a means for converting an analog external signal to a first digital signal.

Multiplexer switch 44 is a conventional "either/or" data path, also referred to a multiplexer means, through which input signals from a plurality of inputs is selectively monitored in response to programming instructions. In the preferred embodiment, multiplexer 44 selects either the output from analog signal converter 42, which is called the first digital signal and is carried via line 43, or the frequency signal arriving at input port 32, via line 45, the selection being in response to a multiplexer control signal from computer 14 transmitted through address selector 40 via line 49.

Counter/data buffer box 46, 48 is a conventional programmable 16-bit counter 46 coupled to a 16-bit data buffer 48. Counter 46 counts the digital pulses selected by multiplexer 44 either from converter 42 or frequency input 32, which signal is sent to the counter via line 47. Data buffer 48 in counter/data buffer box 46, 48 is also referred to as the first data buffer. When the signal processor is configured to operate as an analog-to-digital converter, as in example 1 below, the analog signal 30 monitored by analog signal converter 42 is converted to a data pulse train which is converted, as in example 1, to data which is ultimately stored in data buffer 48. Computer 14 then retrieves the digitized analog signal stored in data buffer 48 by interrogating data buffer 48 one nibble (4-bits) at a time through address selector 40 and line 51.

Oscillator box 50 represents a free run oscillator which serves as the master clock for analog signal processor 10. Oscillator 50 is of a conventional type, such as a crystal oscillator, which feeds a programmable counter to output a clock signal of a selected frequency in response to a terminal count command. Such a terminal count is transmitted to oscillator 50 from personal computer 14 via address selector 40 on terminal count selector line 52. Oscillator 50, also termed the master clock oscillator, output a clock signal to analog signal converter 42 via line 55 and sends reset commands to counter/data buffer 46, 48.

Analog signal processor 10 also has the capability of monitoring one or more digital status signals at digital status inputs 34. Status buffer 56, also referred to as the second data buffer, receives the one or more digital status signals from external sources and buffers the signals until an appropriate status request command is received on the buffer input/output bus 58, which connects to computer 14 through address selector 40. The count in status buffer 56 is fed back to personal computer 14 through line 58 in the nibble mode, with the computer addressing 4-bit data nibbles in buffer 56 through address selector 40 until the entire buffer has been read. Line 58 thus serves as means for transmitting the external digital status signals in buffer 56 to the personal computer through address selector 40. The size of status buffer 56 is a matter of design choice. In the preferred embodiment buffer 56 has an 8-bit capacity.

Another function of the analog signal processor of the present invention is the ability to output one or more digital control signals at control signal output port 36. Auxiliary output buffer 60, also referred to as the control signal output means or the third data buffer, buffers output signals received over auxiliary output buffer bus 62 from personal computer 14, via address selector 40. The data in auxiliary output buffer 60 is set by the personal computer via line 62 in response to programming instructions, the computer addressing selected bits in the buffer through address selector 40. The address selector in line 62 thus serve as means for transmitting instructions to auxiliary output buffer 60 from the personal computer through the logic controller of address selector box 40. In the preferred embodiment auxiliary output buffer 60 has an 8-bit capacity.

A software lock 64 is incorporated into analog signal processor 10 to ensure compatibility between the software used to interact with signal processor 10 and the signal processor device itself. Software lock 64 also prevents unauthorized use of software without signal processor 10, when desired. Software lock 64 is a conventional mask-ROM, or is jumper-configured with a serial number, at the time of manufacture. Software loaded in computer 14, as described below, interrogates software lock 64 to determine that the code implanted in software lock 64 matches that in the software. Once the code has been read and verified as correct, functioning of the signal processing means is allowed to proceed.

Signal processor 10 provides the hardware necessary to permit a personal computer to function as an analogto-digital converter and to perform other control functions. Suitable software drivers must also be provided to operate signal processor 10. The basic element of the software is a Terminate Stay Resident (TSR) driver which talks directly to parallel printer port 12 of computer 14, bypassing the DOS printer port commands. Appendix A is a print-out of the uncompiled source code for a driver which provides communication and control, via the parallel printer port, between external signal processor hardware such as that found in signal processor 10 and a personal computer 10. The listed source code is suitable for use in an IBM PC-type environment and will allow the computer to access and control a signal processor according to the present invention which employs a V/F converter and hardware necessary to convert analog signals to digital form and to feed the data to the computer. The software is not itself part of the signal processor of the present invention and is intended only to be illustrative of software drivers suitable for controlling a signal processor of the type disclosed herein. Those skilled in the art can readily devise alternative and additional software to control and use both the disclosed embodiment and other signal processors in accordance with the present invention. Information about how to communicate with an IBM-type personal computer through the parallel printer port is provided in published literature, for example, *The Programmers PC Sourcebook*, by Thom Hogan, Microsoft Press, 1988.

Essentially, the software installed in computer 14 must include the proper address codes for accessing the elements within signal processor 10 to perform whatever tasks are desired. Addresses for this purpose are the predetermined codes within address selector 40 for accessing individual components or for retrieving data. The hardware elements addressable by computer 14 through address selector 40 include analog signal converter 42; multiplexer 44, which can be set via line 49 to deliver to counter 46 either the output of converter 42 or the frequency signal at port 32; oscillator 50, which can be set via line 52 to a selected clock frequency or supplied with a terminal count to determine the reset interval; status buffer 56, for interrogating and reading the status signals at one or more of the digital status input lines; and auxiliary output buffer 60 for providing output control signals to specific ones of the plurality output control signal lines via line 62.

Address selector 40, in addition to its addressing function, also functions as a printer control means for selectively taking printer 18 on and off-line in response to commands from computer 14. Whenever signal processor 10 is turned off, meaning that an activating signal has not been sent from computer 14 turning it on, the logic controller which includes address selector 40 places signal processor 10 in a transparent mode wherein printer data is passed directly through from parallel printer port 12 to printer input port 16. The logic controller of address selector 40 also can place signal processor 10 in a nontransparent mode wherein the connection to external printer 18 is blocked. Data buses 70 and 72 within signal processor 10 pass data and status signals between input port 22 and output port 26 when signal processor 10 is in the transparent mode.

When the monitoring or control functions of signal processor 10 are accessed or enabled by the personal computer, an appropriate command is sent from the computer to address selector 40, turning on signal processor 10. Whenever that happens, address selector 40 acting as a print controller, automatically enables the nontransparent mode of signal processor 10, blocking all printer data and command signals to the external printer 18. This is done because functioning of the signal processor will generate garbled printer commands at least part of the time if the printer remains on-line. It might also scramble or reset printer initialization codes. The TSR driver within personal computer 14 will consequently command processor 10 to suspend printer functions by entering the nontransparent mode whenever any signal processor 10 functions are being used.

To illustrate some of the functions of the signal processing means of the present invention during the performance of various tasks, three examples illustrating different measurement and control operation are described below.

EXAMPLE 1

In this example the signal processor 10 will function as a analog-to-digital converter, digitizing an analog voltage at 10 millisecond intervals. Personal computer 14 is programmed to control the digitizing process by the user selecting the desired A/D function and 10 millisecond digitizing interval, which the software will then covert into an appropriate series of commands. Table 1 below illustrates an address sequence for performing this function, with a word description of the functional sequence following.

Certain abbreviations are used in Table 1 and in the tables in the following examples. Each of the abbreviations is identified below by both the name appearing in the text and the reference number appearing on the figure: SW Lock=software lock 64; MCO=main clock oscillator 50; Converter=analog signal converter 42; MUX=multiplexer 44; and Aux. Buffer=auxiliary output buffer 60.

Returning to Example 1, the addresses appearing in Table 1 below are predetermined combinations of pin values appearing at the inputs to the logic control block in address selector 40. The actual pin values used are unimportant because anyone skilled in the art will be able to develop suitable addresses for such a logic controller. Address selector 40 takes the addressed and routes signals appearing at selected pins according to predetermined instructions. Personal computer 14 produces appropriate combinations of pin values at parallel printer port 12. Those values will, in turn, be read by address selector 40, which then transmits the data appearing at other pins to the addressed element. As set forth below, a single address to certain elements, such as master clock oscillator 50, initiates a sequence of events automatically within signal processor 10. In Example 1, the selected function is A/D conversion.

TABLE 1

Illustrative Address Sequence:
Digitizing an Analog Voltage

| Addressed Element | Function |
|---|---|
| (1) Address Selector | Turn-On Signal Processor |
| (2) SW Lock | Read Code |
| (3) MCO | Load Terminal Count |
| (4) MUX | Select Frequency Source-Converter |
| (5) MCO | Initiate Digitize Signal |
| (6) Data Buffer | Read Count |
| (7) Address Selector | Turn-Off Signal Processor |

(1) The illustrative address sequence appearing in Table 1 begins with a signal from computer 14 to address selector 40, turning on signal processor 10. The logic control block of address selector 40, upon receipt of a signal turning on the signal processor, disables the transparent mode and enables the nontransparent mode of the signal processor. That cuts the connection to external printer 18 via data and status buses 70, 72, respectively, terminating all signals to and from the external printer. Until the digitizing function of this example is completed, signal processor 10 will remain in the nontransparent mode.

(2) Software lock 64 is addressed and interrogated for the correct software lock code. Once the code is read and verified, the computer moves on to the next step. Should the software lock produce an incorrect security code, signal processor functions will be stopped within computer 14 and an appropriate message such as "copyright violation" will appear on the computer screen.

(3) The master clock oscillator 50 is addressed and a selected terminal count is loaded. Line 52, which transmits the terminal count instructions to oscillator 50, serves as means for transmitting convert command interval instructions from the personal computer to oscillator 50 through address selector 40. In the embodiment described herein, oscillator 50 is set to 4-MHz, with the terminal count being programmable to establish a digitizing cycle duration. In this example, the digitizing cycle is 10-milliseconds and oscillator 50 outputs a terminal count signal via line 53 to counter 46 every 10-milliseconds. Oscillator 50 also supplies clock pulses at a 4-MHz rate via line 55 to converter 42.

(4) Multiplexer 44 is addressed via line 49 to select which of the two possible input signals is output to counter 46 via line 47. In this example, the output from converter 42, called the first digital signal, is selected. In the preferred embodiment, the first digital signal is a 16-bit pulse train. Multiplexer 44 is an "either/or" device which selects either the output of converter 42 or the frequency signal input at port 32 for transfer to counter 46.

(5) The next address in the sequence is to oscillator 50 to initialize the digitizing cycle. Oscillator 50 is given a command to send a signal to counter 46 via line 53 resetting and releasing counter 46 to begin counting the pulses arriving from converter 42 via multiplexer 44 and line 47. As such, oscillator 50 serves as a means for automatically initiating convert commands at intervals determined by instructions from the personal computer. The pulses output from V/F converter 42 are proportional to the analog voltage at input 30. Counter 46 responds to the output of V/F converter 42 by counting the pulses output, the final count over each digitizing cycle being proportional to the voltage at input 30. When the programmed terminal count interval of oscillator 50 is reached, concluding a digitizing cycle, the number in counter 46, containing information about the analog voltage at input 30, is latched into data buffer 48 for storage and counter 46 is zeroed to begin another count cycle. In the preferred embodiment, buffer 48 is at least a 16-bit buffer. At this point address selector 40 has completed one cycle as the logic controller for signal processor 10 by taking the digitized analog signal from analog signal converter 42 and transferring it via counter 46 into data buffer 48. The resultant data in data buffer 48 contains information about the analog signal arriving at input port 30 and, in the preferred embodiment, is proportional to that analog signal.

(6) Computer 14 then addresses data buffer 48 via line 51 to read the count obtained during the digitizing cycle. Data is fed back to computer 14 in the nibble mode, with the computer, through address selector 40, addressing 4-bit data nibbles in buffer 48 until the entire count has been read. Address selector 40, through which information is passed to and from computer 14, thus serves as the logic control means for transmitting data from data buffer 48 to the personal computer through parallel printer port 12. The count in data buffer 48 is fed back to personal computer 14 through the status lines on the parallel printer port interface. Data can be transferred to the personal computer while the next digitizing cycle is in progress.

Address sequence steps (5) and (6) are repeated successively if a continuous series of digitizing cycles is sought. Oscillator 50 will continue outputting terminal count signals at the selected interval, clearing counter 46 and initiating successive counts automatically. If only a single reading of an analog signal is desired, for example if a temperature is to be read once every 10 minutes, the signal processor will be turned off after the data in buffer 48 has been transferred in nibble mode to the personal computer and no successive counts initiated.

(7) In order to shut down the signal processor, a final address is made to address selector 40 with the correct code for turning off signal processor 10. Once off, address selector 40 automatically enables the transparent mode of the signal processor, permitting direct throughput of signals from the computer's parallel printer port 12 to external printer input port 16.

The computer can be programmed to instruct signal processor 10 to take a single reading of an analog signal monitored at analog input port 30 using the above sequence or to continuously monitor the analog signal at a rate determined by the terminal count interval. Using a V/F converter for analog signal converter 42 and a 16-bit counter in counter block 46, extremely high digitizing resolution is possible at a relatively low sampling rate. Conversely, lower resolution at a higher sampling rate can be achieved by setting a lower terminal count and more frequent readings. Personal computer 14 can be used to select any desired regimen for monitoring an analog signal such as a voltage input at port 30.

EXAMPLE 2

Frequency Monitoring With Autoranging

In this example signal processor 10 will monitor a frequency signal such as the revolutions per minute (rpms) of a shaft or engine supplied by a tachometer to frequency input 32. Personal computer 14 is first programmed to request frequency monitoring with autoranging and a monitoring cycle value is selected. In situations where the actual frequency being monitored is unknown or not known with accuracy, an initial long monitoring cycle is selected and the computer's autoranging function will adjust the monitoring interval downward until a true count is made, as described below. The sequence of addresses used in this function is set forth in Table 2, which is followed by a word description of the steps carried out by the computer and signal processor.

TABLE 2

Illustrative Address Sequence:
Frequency Monitoring with Autoranging

| Addressed Element | Function |
|---|---|
| (1) Address Selector | Turn-On Signal Processor |

TABLE 2-continued

Illustrative Address Sequence:
Frequency Monitoring with Autoranging

| Addressed Element | Function |
|---|---|
| (2) SW Lock | Read Code |
| (3) MCO | Load Terminal Count |
| (4) MUX | Select Frequency Source-Freq. Signal |
| (5) MCO | Initiate Monitoring Cycle |
| (6) Data Buffer | Read Count or Overflow |
| (7) MCO (if count overflow) | Set New Terminal Count |
| (8) MCO | Initiate Monitoring Cycle |
| (9) Data Buffer | Read Count |
| (10) Address Selector | Turn-Off Signal Processor |

As with Example 1, the monitoring of a frequency signal at input 32 of signal processor 10 is initiated by a (1) addressing selector 40 to turn on the signal processor and enable the nontransparent mode. (2) Software lock 64 is interrogated. (3) A terminal count is loaded into oscillator 40 consistent with the initial monitoring interval selected. If the frequency is unknown, a long cycle of, for example, 10-milliseconds will initially be selected. (4) Multiplexer 44 is addressed to select the frequency source monitored by counter 46. In this example, the frequency signal at input 32 is supplied to counter 46 via line 47. (5) Oscillator 50 is addressed to initiate a monitoring cycle which is sent to counter 46 via line 53, zeroing the counter and beginning a count of the pulses arriving at frequency input port 32. At the conclusion of a cycle, a reset signal is sent to counter 46 via line 53 while the count is transferred to data buffer 48. If the frequency signal overflowed 16-bit counter 46, an overflow/error bit is set in data buffer 48. (6) When computer 14 interrogates data buffer 48 and an overflow is indicated, the program in computer 14 shortens the monitoring interval. (7) The oscillator 50 is addressed whenever data buffer 48 has overflowed and the new terminal count, set by personal computer 14 in accordance with programming instructions, is loaded into oscillator 50. Address sequence steps (5), (6) and (7) are then repeated until a sufficiently short monitoring cycle is reached for counter 46 to read the input frequency signal without counter overflow. When that happens, the address sequence jumps to (8), a mode in which oscillator 50 initiates successive monitoring cycles where the pulses of frequency signal at 32 are monitored by counter 46 and the data is read in the nibble mode by addressing (9) data buffer 48.

Data read by computer 14 is converted to frequency information by software in the computer. When the frequency monitoring function has been completed, computer 14 addresses address selector 40 to turn off the signal processor (10) and enable the transparent mode.

EXAMPLE 3

Process Control Application

Signal processor 10 will be used to control a conveyor running through a tunnel-style oven. The conveyor and oven include devices for monitoring various conditions and outputting digital status signals which are fed to digital status inputs 34 of signal processor 10. In this example, the digital status inputs are Emergency Stop, Conveyor Forward, Safety Interlock, Over Temp, Stop and Start. The conveyor and oven are provided with control devices responsive to digital control signals connected to control signals output 36 of signal processor 10. In this example the following digital control signals are provided to the conveyor and oven via output 36: Motor Off, Motor On Forward, Motor On Reverse, Heater On, Emergency Stop Alarm and System Fault Warning. Personal computer 14 will be in an interactive mode throughout the process control application, constantly poling various inputs and displaying system information, as determined by the software program. At selected intervals, in accordance with programming instructions, the signal processor will be switched off-line and the transparent mode enabled to allow for printing of selected parameters.

TABLE 3

Illustrative Address Sequence:
Process Control Application

| Addressed Element | Function |
|---|---|
| (1) Address Selector | Turn-On Signal Processor |
| (2) SW Lock | Read Code |
| (3) Status Buffer | Poll System Status Devices |
| (4) Address Selector | Turn-Off Signal Processor |
| (5) MCO | Load Terminal Count |
| (6) MUX | Select Frequency Source-Counter |
| (7) MCO | Initiate Digitizing Cycle |
| (8) Data Buffer | Read Count |
| (9) Auxiliary Buffer | Heater On/Off |
| (10) Status Buffer | Poll System Status Devices |
| (11) MCO | Load Terminal Count |
| (12) MUX | Select Frequency Source-Freq. Signal |
| (13) MCO | Initiate Monitoring Cycle |
| (14) Data Buffer | Read Count or Overflow |

As in the previous two examples, the system initially (1) addresses address selector 40 to turn on signal processor 10 and enable the nontransparent mode, blocking signals to printer 18. (2) Software lock 64 is interrogated.

The personal computer and signal processor 10 are being employed both to continuously monitor and assist in the control of the conveyor and oven. If the conveyor and oven are down, only monitoring will be performed by (3) addressing status buffer 56, in which the latest condition of each of the six digital status inputs are latched. Computer 14 will pole each of the digital inputs, transferring them into the computer in the nibble mode and comparing the signals against preset parameters. If all status inputs are correct, and no change is ordered by the person operating the system, the computer will (4) address selector 40 to turn off signal processor 10 and enable the transparent mode. Software can then send a print signal to printer 18, providing system status, for example, along with date and time. The steps (1) through (4) are repeated until a status change requires some action or the person operating the system wishes to initiate other system functions.

Assuming the oven must first be preheated, when the operator decides to turn on the conveyor oven system, computer 14 will turn on the system at the signal processor using steps (1) and (2) above. Next, the computer will address oscillator 50 and load in a terminal count to begin digitizing an analog temperature signal arriving at input port 30. (6) Multiplexer 44 will be addressed to select the output of analog signal 42 for transfer to counter 46. (7) Oscillator 50 is addressed to initiate the digitizing cycle as in example 1, above. At the end of each digitizing cycle, the number in counter 46 will be transferred to data buffer 48 and the computer will (8)

address data buffer 48 to read the count. At the conclusion of one or more analog signal conversions, computer 14 will have acquired the temperature signal from the oven. If the temperature is low, the computer will next (9) address auxiliary output buffer 60 via bus 62 and send a function code to the output bit controlling the oven heater. Steps (7), (8) and (9) will be repeated until the temperature reaches the correct value. During oven warm-up, a message can be displayed on the screen such as "system warm-up cycle in process."

Once the oven has reached the correct temperature the message on the computer screen will change to "press start button" or the like to instruct the operator to initiate operation of the conveyor. During temperature monitoring, steps (7) and (8) will be repeated in the usual manner to perform analog-to-digital conversion of the temperature signal until it is determined to be within the proper range, after which the computer will address the auxiliary output buffer 60 to switch off the heater. During operation of the conveyor and oven, computer 14 will poll the various digital status inputs by (10) addressing status buffer 56 at intervals selected by the computer software. The computer will also be programmed to monitor the analog oven temperature signal at input 30 in a predetermined sequence along with the other system polling functions. The software can also be programmed to shut down signal processor 10 from time to time to allow a print-out of system status on printer 18.

Another parameter that can be measured in the process control application is conveyor speed, through a tachometer fed to frequency input port 32. To obtain frequency information, computer 14 will operate in the manner of Example 2 above, performing frequency monitoring with autoranging. To interrogate frequency signal input 32, the computer addresses multiplexer 44 to switch the frequency source supplied to counter 46. (11) Oscillator 50 is addressed to load a terminal count for frequency monitoring. (12) Multiplexer 44 is addressed to reset the frequency selection to supply the frequency signal input at 32 to counter 46. Oscillator 50 is then addressed to initiate a monitoring cycle and the value in data buffer 48 is fed to the computer in the nibble mode. If counter 46 overflowed, the computer will select a new terminal count, (11) address oscillator 50 and load a new terminal count into the oscillator. The cycle will then be repeated in the manner of Example 2 until a frequency signal has been read. Any abnormalities detected in conveyor operation will be responded to by computer 14 in accordance with predetermined software instructions.

The sequence and frequency of various status system interrogations is determined by the user in preparing the software program for process control. Monitoring frequency, the nature and frequency of information printed on printer 18, range and nature of responses to abnormal conditions, frequent monitoring of certain perimeters and infrequent monitoring of other perimeters and the content of display messages on the computer screen are all a matter of choice within the control of the system programmer. A personal computer allows for great flexibility of process control when used with the signal processing means of the present invention.

Signal processor 10 is both flexible in its control applications and convenient and simple to use. Those skilled in the art of software programming will readily be able to write programs which make use of the signal processor for a variety of purposes. Because the signal processor is constructed of relatively inexpensive devices, it provides an economical means for greatly increasing the uses to which a personal computer can be put. Monitoring and control functions which heretofore often require dedicated control equipment now can be accomplished with a personal computer. It also allows an individual computer owner to perform a analog-to-digital conversion without the need to physically open the computer and insert an additional card into the PC bus.

Alternative embodiments of the signal processing means are possible within the scope of the present invention. For example, analog signal converter 42, which in the illustrative embodiment is a V/F converter, could be an analog-to-digital converter which reads the analog signal at input 32 and converts it to a plural-bit number internally. The output of an analog-to-digital converter could be transferred directly to data buffer 48 via a suitable bus, bypassing multiplexer 44 and counter 46. In such a configuration, address selector 40 would address A/D converter 42 directly to initiate a conversion. Alternatively, the analog-to-digital converter could include its own internal data buffer which would be equivalent to data buffer 48 and serve as the first data buffer of the signal processor of the present invention. Bus line 75 is included in FIG. 1 to illustrate part of the circuitry of an alternative embodiment incorporating an analog-to-digital converter with an internal data buffer in box 42. The analog-to-digital converter in box 42 would be addressed directly by address selector 40 via line 75. Line 43 would be eliminated. If the converter did not include an internal clock, clock pulses from oscillator 50 would be supplied to the converter 42 via line 55. Terminal count or digitizing frequency signals would also be supplied to the converter by oscillator 50. Digitized analog signal data stored in the A/D converter's internal data buffer (not shown) would be fed back to computer 14 in the nibble mode, with the computer addressing 4-bit data nibbles in the internal buffer through address selector 40 and line 75, until the entire count had been read. In such an alternative embodiment, oscillator 50 and counter/data buffer 46, 48 would still be used to process frequency signals arriving at input port 32. The function of software lock 64 and digital status input and output buffers 56 and 60, respectively, would be unchanged, as would the overall function of address selector 40 described above. Multiplexer 44 would not be used in the A/D converter embodiment. Frequency data in buffer 48 would still be read via nibble mode as in the first embodiment.

Other alternative embodiments are also possible. The size of counter 46 and data buffer 48, which are 16-bits in the illustrative embodiment could be either larger or smaller, depending primarily on cost considerations. More or fewer digital status inputs 34 and control signal outputs 36 could be provided. Additional modifications within the scope of the present invention will occur to those skilled in the art.

A self-contained signal processing means is provided for connection between a parallel printer port of a personal computer and a printer. The signal processing means allows the personal computer to monitor external signals such as analog and frequency signals without the requirement that the computer be physically opened and additional circuitry and devices be installed. The signal processor is capable of digitizing analog signals for ready retrieval by the personal computer through the parallel printer port. The signal processor can also monitor external digital status signals and can output digital control signals in response to program instructions from the personal computer.

APPENDIX A

There follows a print-out of uncompiled source code containing a TSR driver written to run in an IBM PC-type environment. The software is installed in a PC computer by floppy disc or another conventional means and, in the example given, controls the functioning of a signal processor according to the present invention which includes transparent and nontransparent mode capability, a V/F converter, an analog signal multiplexer, an oscillator and a counter and data buffer necessary for voltage signal conversions. The below-listed software contains material which is subject to copyright protection and the copyright owner grants the right to copy the printed listing contained in any patent document appearing in any issued patent or made public in any Patent and Trademark Office records, but otherwise reserves all copyright rights whatsoever.

```
;
;   SPTSR
;
;      This is a terminate/stay resident driver designed to support
;      the signal processor application at the TURBO Pascal level.
;
;      The TSR is loaded before the TURBO program is executed.
;      Special INT calls are defined so that Pascal can communicate
;      with the TSR.
;
;

; Define constants used in driver debug         equ     0       ;DEBUG Mode (1=suppress PV I/O)
filter        equ     1       ;FILTER Mode (1=filter)
timer0$int    equ     8h      ;INT for TIMER 0 service
pv$int        equ     78h     ;INT for Signal Processor
timer         equ     40h     ;Port address for 8253 counter
eoi           equ     20h     ;End Of Interrupt
$8259         equ     20h     ;port address of 8259
bios_seg      equ     40h     ;seg address of bios data
head_pntr     equ     1Ah     ;keybd bufr head pointer offset
tail_pntr     equ     1Ch     ;keybd bufr tail pointer offset
lpt1_base     equ     8h      ;lpt1 port base address ; Set up labels to point to key memory locations interrupts    segment at 0h
              org      timer0$int*4    ;offset for Timer 0 INT
timer_int     label    word            ;pointer to int vector
              org      pv$int*4        ;offset for PV INT
pv_int        label    word            ;pointer to int vector
interrupts    ends code_seg      segment
              assume   cs:code_seg
              org      100h            ;starting offset for .COMs first:        jmp      load_tsr        ;one time init entry point ;
; This area is reserved for DATA asssociated with the TSR --
; it resides in the code segment so it is accessible to the
; driver.

%out     ...Data Area Assignments
mesg1   db    0Dh,0Ah,'Signal Processor Driver Installed',0Dh,0Ah
        db    '(c)1989 Physio Systems, Inc.',0Dh,0Ah,'$'
mesg2   db    0Dh,0Ah,'Driver already installed!',0Dh,0Ah,'$'
mesg3   db    '[DEMO Mode Enabled]',0Dh,0Ah,'$'
mesg4   db    '[FILTER Disabled]',0Dh,0Ah,'$'
tick55_reg    dw      ?
tick10_reg    dw      ?
timer$10      dw      ?
old_time0_int dw      2 dup (?)
```

```
pv_reg1         dw      ?
pv_reg2         dw      ?
old_reg1        dw      ?
timer$1msec     dw      ?
acq_mode        dw      ?
acq_buf_seg     dw      ?
acq_buf_off     dw      ?
acq_pntr        dw      ?
acq_max         dw      ?
para_mode       dw      ?
seed_value      dw      ?
amux_reg        dw      ?
serial_num      dw      ?
port_adr        dw      ?
```

```
;
;   This procedure establishes the "User-defined" PV INT call
;   located at $78
;   Calling sequence is as follows:
;
;       mov     ah,<func code>      ;Signal Processor Function code
;       mov     al,<parm>           ;parameter (if any) in al
;       mov     bx,<parm>           ;additional parameters as needed
;       mov     cx,<parm>           ;additional parameters as needed
;       mov     dx,<parm>           ;additional parameters as needed
;       int     78h                 ;call PV Driver
;       .                           ;parameters (if any) returned
;       .                           ;in registers AX,BX,CX,DX %out    ...User-Defined Interrupt Service
pvint   proc    near ; Vector control to the desired function based on contents of
; AH register push    ax                  ;save func code & parameter
        mov     al,ah               ;move func code to al
        mov     ah,0                ;clear MSB
        mov     di,ax               ;function code in di
        pop     ax                  ;restore parameter in al
        shl     di,1                ;convert to word pointer
        jmp     word ptr cs:[di+func_table]

func_table  label   word
        dw      int_78$func0        ;Read PV Registers
        dw      int_78$func1        ;Clear 1 msec UP counter
        dw      int_78$func2        ;Read 1 msec UP counter
        dw      int_78$func3        ;Start/Stop Acquisition
        dw      int_78$func4        ;Acquisition Status
        dw      int_78$func5        ;ENABLE Signal Processor
        dw      int_78$func6        ;ENABLE "Printer Transparent"
        dw      int_78$func7        ;Select Analog MUX
        dw      int_78$func9        ;Read Serial Number
        dw      int_78$func10       ;Generate "Hard Printer Reset"
        dw      int_78$func11       ;Clear 10 msec UP counter
        dw      int_78$func12       ;Read 10 msec UP counter ; Support for driver functions begins here...

;
; ** FUNCTION 0: PV_Regs
;           In the Signal Processor clock handler, two registers
;           are updated every 10 msec with the contents of
;           the V To F converters.  These registers can be
;           read for use with "single" conversions, or to
;           monitor status during acquisition.
;
```

```
;                       ax reg returns with PV register 1
;                       bx reg returns with PV register 2
;
int_78$func0:
        mov     ax,pv_reg1              ;pass back PV reg1
        mov     bx,pv_reg2              ;and likewise for reg2
        jmp     int_78$exit             ;and return ;
; ** FUNCTION 1: Clear_1msec
;           Clear the 1 millisecond UP counter register
;
int_78$func1:
        mov     ax,0
        mov     timer$1msec,ax          ;clear counter register
        jmp     int_78$exit             ;and return ;
; ** FUNCTION 2: Read_1msec
;           Read the 1 millisecond UP counter register
;                   ax reg returns with 1 millisecond UP count
;
int_78$func2:
        mov     ax,timer$1msec          ;pass back counter value
        jmp     int_78$exit             ;and return ;
; ** FUNCTION 3: Acquisition Start/Stop
;           Start/Stop the interrupt-based acquisition
;                   cx = # of 1 word elements to acquire
;                        (a zero indicates STOP)
;                   es = SEG address of data buffer
;                   si = OFFSET address of data buffer
;
int_78$func3:
        cmp     cx,0                    ;test for zero count
        jne     func3$1                 ;non-zero means START ACQ
        mov     acq_mode,cx             ;clear mode flag to STOP ACQ
        jmp     int_78$exit             ;and return
func3$1:
        mov     acq_max,cx              ;save max # elements
        mov     acq_buf_seg,es          ;save seg address
        mov     acq_buf_off,si          ;save offset address
        mov     ax,0
        mov     acq_pntr,ax             ;initialize acq pointer
        mov     ax,1
        mov     acq_mode,ax             ;Set ACQ "mode" to START
        jmp     int_78$exit             ;and return ;
; ** FUNCTION 4: Acquisition Status
;           Return the current acquisition status
;                   ax reg returns with ACQ_MODE (0=off/1=on)
;                   cx reg returns with ACQ_PNTR
;
int_78$func4:
        mov     ax,acq_mode             ;acq mode
        mov     cx,acq_pntr             ;acq pointer
        jmp     int_78$exit             ;and return ;
; ** FUNCTION 5: ENABLE Signal Processor
;           Performs a "hard reset" on the parallel
;           port, thus gaining control of the Signal Processor.
;           The PARA_MODE flag is enabled.
;                   bx = driver "seed" value to return in DEBUG mode
;                   dx = port address (0=lpt1,1=lpt2)
;
```

```
int_78$func5:
        mov     seed_value,bx           ;save the "seed" parameter
        mov     ax,bios_seg
        mov     es,ax                   ;seg reg points to bios data
        and     dx,1                    ;mask LS bit
        shl     dx,1                    ;compute word offset
        mov     si,dx                   ;load into pointer reg
        mov     ax,es:[si+lpt1_base]    ;get base port address in table
        mov     port_adr,ax             ;save port address
        call    para_reset              ;"Enable" Signal Processor
        jmp     int_78$exit             ;and return ;
; ** FUNCTION 6: ENABLE Printer Transparent Mode
;           Disables the Signal Processor and enables
;           "Printer Transparent" Mode.  All data
;           sent to parallel port bypasses the Signal Processor
;           command decoder and is sent to the printer.
;
int_78$func6:
        call    para_reset              ;"enable" Signal Processor
        call    prnt_enable             ;send "Prntr Transpt" command
        jmp     int_78$exit             ;and return ;
; ** FUNCTION 7: Analog Mux Select
;           Writes the "amux_reg" register with the bit to
;           "OR" into a Signal Processor command.  Data Bit D5
;           is used to select the analog mux input:
;               bx = Mux Select (Bit 5 OFF = Torq, Bit 5 ON = Pos)
;
int_78$func7:
        and     bx,00100000b            ;mask bit 5 only
        mov     amux_reg,bx             ;and save MUX select register
        jmp     int_78$exit             ;and return ; This is the Signal Processor Acquisition Handler which is
; invoked at a 100 Hz rate.  It handles the following:
;
;  1)  "Latches" and reads contents of the Signal Processor
;      registers.  This is accomplished through the
;      parallel port.  Conversion for the next sample
;      is automatically initiated by the PVerter hardware
;
;  2)  "Acquires" data into a user-supplied RAM buffer
;      (if "acq_mode" is active).  User-defined software
;      interrupts are used to set pointers and control
;      acquisition.

acq_handler  proc   near
        call    para_latch              ;"halt" and latch
        mov     ax,pv_reg1
        mov     old_reg1,ax             ;save "old" value
        mov     pv_reg1,0               ;clear registers
        mov     pv_reg2,0

;NIBBLE 0
        mov     al,0                    ;"nibble" to read in al
        call    nib_read                ;return nibble in ah reg
        mov     al,ah                   ;shift to low byte
        mov     ah,0                    ;clear hi byte
        add     pv_reg1,ax              ;"OR" into register
;NIBBLE 1
        mov     al,1                    ;"nibble" to read in al
        call    nib_read                ;return nibble in ah reg
        mov     al,ah                   ;shift to low byte
```

```
                shl     al,1
                shl     al,1
                shl     al,1
                shl     al,1
                mov     ah,0            ;clear hi byte
                add     pv_reg1,ax      ;"OR" into register
;NIBBLE 2
                mov     al,2            ;"nibble" to read in al
                call    nib_read        ;return nibble in ah reg
                mov     al,0            ;clear lo byte
                add     pv_reg1,ax      ;"OR" into register
;NIBBLE 3
                mov     al,3            ;"nibble" to read in al
                call    nib_read        ;return nibble in ah reg
                shl     ah,1
                shl     ah,1
                shl     ah,1
                shl     ah,1
                mov     al,0            ;clear lo byte
                add     pv_reg1,ax      ;"OR" into register
;NIBBLE 4
                mov     al,4            ;"nibble" to read in al
                call    nib_read        ;return nibble in ah reg
                mov     al,ah           ;shift to low byte
                mov     ah,0            ;clear hi byte
                add     pv_reg2,ax      ;"OR" into register
if debug
                mov     ax,seed_value   ;"seed" value
                mov     pv_reg1,ax      ;in debug mode, force
                mov     ax,0Fh          ;all status bits ON
                mov     pv_reg2,ax      ;registers to dummy values endif ;
; Apply .75/.25 weighted filter to input channel
;
if filter
                mov     ax,old_reg1     ;"old" value
                mov     bx,pv_reg1      ;"new" value
                call    filter$75       ;filter, result in bx
                mov     pv_reg1,bx      ;save filtered value
endif ; Check the ACQ_MODE flag to determine if acquisition
; is in progress. If so, save contents of register 1
; in the user-supplied data buffer.

mov     ax,acq_mode     ;get flag
        cmp     ax,0
        jne     acq$1           ;non-zero means ACQ in progress
        jmp     acq_exit        ;zero means exit handler
acq$1:
        mov     es,acq_buf_seg  ;buffer seg address
        mov     si,acq_buf_off  ;buffer offset address
        mov     bx,acq_pntr     ;word pointer to data
        mov     ax,pv_reg1      ;signal data
        shl     bx,1            ;convert to byte pointer
        add     si,bx           ;add to offset address
        mov     es:[si],ax      ;save data in buffer inc     acq_pntr        ;next element
        mov     ax,acq_pntr     ;get new value
        mov     bx,acq_max      ;max # of elements
        cmp     ax,bx
        jb      acq$2           ;pointer still in range
        mov     ax,0
```

```
                mov     acq_mode,ax         ;buffer full, shut down ACQ
acq$2:

acq_exit:
                ret
acq_handler     endp

;
; ** FILTER$75
;
; This procedure accepts two values for filtering as follows:
;
;               ax = "old" or previous value
;               bx = "new" or current value
;
; The output of the filter is:
;
;               bx = (0.75 * old) + (0.25 * new)
;

filter$75       proc    near
                shr     bx,1                ; new / 2
                shr     bx,1                ; new / 4
                shr     ax,1                ; old / 2
                mov     dx,ax               ; save in dx reg
                shr     ax,1                ; old / 4
                add     ax,dx               ; compute .75 * old
                add     bx,ax               ; and add .25 * new
                ret
filter$75       endp ;
; This procedure sends a Signal Processor command as follows:
;    1) Eight bit command is send on port address lpt_port+0
;    2) Strobe is toggled on port address lpt_port+2
;

pv_command      proc    near
ife debug
                mov     dx,port_adr         ;lpt port base address
                out     dx,al               ;send it
                inc     dx
                inc     dx
                mov     al,0Dh              ;strobe hi
                out     dx,al
                mov     al,0Ch              ;strobe lo
                out     dx,al
endif
                ret
pv_command      endp ;
; This procedure commands the Signal Processor to do a PRINTER ;
RESET
printer_reset   proc    near
                mov     al,byte ptr amux_reg ;analog mux select
                add     al,0h               ;d7=0/reset
                call    pv_command          ;send PV command
                ret
printer_reset   endp ;
; This procedure sends the Signal Processor command to
; enable PRINTER TRANSPARENT mode.  The "para_mode"
; flag is cleared.
;
prnt_enable     proc    near
```

```
                mov     para_mode,0             ;disable Signal Processor
                mov     al,byte ptr amux_reg    ;analog mux select
                add     al,0C0h                 ;D7=1, D6=1 for "print"
                                                 mode
                call    pv_command
                ret
prnt_enable     endp ;
; This procedure performs a "hard reset" on the parallel port,
; and thus regains control of the Signal Processor. The ;
; "para_mode" flag is enabled. The Signal Processor command ;
; register is initialized to all zeros (except reset bit D7).
;
para_reset      proc    near
                mov     para_mode,0             ;disable handler ife debug
                mov     dx,port_adr             ;base lpt port
                inc     dx
                inc     dx                      ;output port address
                mov     al,8                    ;set init line low
                out     dx,al                   ;send command mov     ax,1000
para$1:         dec     ax
                jnz     para$1 mov     al,0Ch                  ;no ints, non auto-lf, init hi
                out     dx,al                   ;send command
                mov     al,80h                  ;D7=1, all others 0
                call    pv_command
endif
                mov     para_mode,1             ;enable Signal Processor
                ret
para_reset      endp para_latch      proc    near
                mov     al,byte ptr amux_reg    ;analog mux select
                add     al,080h                 ;D7=1,D4=0 to halt & latch
                call    pv_command
                ret
para_latch      endp nib_read        proc    near
                shl     al,1                    ;(D3,D2,D1)=nibble#
                add     al,byte ptr amux_reg    ;analog mux select
                add     al,10h                  ;(D4)=1 to resume conv
                add     al,81h                  ;D7=1/no reset, D0=1/nib
                                                 read
                call    pv_command
                mov     dx,port_adr
                inc     dx                      ;point to status port
                in      al,dx                   ;get "status"
                mov     ah,al                   ;shift to ah reg
                and     ah,0F8h                 ;turn off unused bits
                shr     ah,1
                shr     ah,1
                shr     ah,1                    ;shift data into D3,D2,D1,D0
                and     ah,0Fh                  ;strip nibble only
                ret
nib_read        endp ;
; This is the initialization section of the TSR. It establishes
; the appropriate interrupt vectors, then exits via the DOS INT ;
; 27h service which allocates memory to the resident driver.

%out    ...TSR Initialization
load_tsr        proc    near
```

```
            assume  ds:interrupts
            mov     ax,interrupts
            mov     ds,ax                    ;DS points to interrupt page mov     ax,offset pvint          ;get offset of int handler
            cmp     ax,pv_int                ;compare to current address
            jne     load_cont                ;handler not installed ;
; Handler already installed.  Perform any cleanup if desired...
;

push    cs
            pop     ds                       ;ds = seg
            mov     dx,offset mesg2          ;dx = offset
            mov     ah,9h                    ;PC DOS PRINT_STRING func
            int     21h                      ;PC DOS service
            int     20h                      ;exit to DOS load_cont:
; initialize any driver variables if desired...
    cli                                      ;suspend interrupts
    mov ax,timer_int                         ;get old service routine vector
    mov old_time0_int,ax                     ;save
    mov ax,timer_int[2]
    mov old_time0_int[2],ax mov timer_int,offset clock               ;set up new int vectors
    mov timer_int[2],cs mov pv_int,offset pvint                  ;Signal Processor driver vector
    mov pv_int[2],cs mov ax,0
    mov tick55_reg,ax                        ;init 55 "tick" register
    mov tick10_reg,ax                        ;init 10 "tick" register
    mov timer$10,ax                          ;init 10 msec counter
    mov acq_mode,ax                          ;init acquisition "mode"
    mov para_mode,ax                         ;disable Signal Processor
    mov amux_reg,ax                          ;init analog mux to "Force"

mov al,0A9h                              ;Send a 4A9h to counter
                                             ;for 1000Hz interrupt rate
    out timer,al                             ;send LSB to counter
    mov al,04h
    out timer,al                             ;send MSB to counter
    sti                                      ;re-enable interrupts push    cs
            pop     ds                       ;ds = seg
            mov     dx,offset mesg1          ;dx = offset
            mov     ah,9h                    ;PC DOS PRINT_STRING func
            int     21h                      ;PC DOS service if debug
            push    cs
            pop     ds                       ;ds = seg
            mov     dx,offset mesg3          ;dx = offset
            mov     ah,9h                    ;PC DOS PRINT_STRING func
            int     21h                      ;PC DOS service
endif ife filter
            push    cs
            pop     ds                       ;ds = seg
            mov     dx,offset mesg4          ;dx = offset
            mov     ah,9h                    ;PC DOS PRINT STRING func
```

```
        int     21h                     ;PC DOS service
endif mov     dx,offset load_tsr      ;reserve all but init routine
        int     27h                     ;and attach to DOS
load_tsr endp
code_seg ends
        end     first                   ;start address for linker!
```

What is claimed is:

1. Signal processing means for connection between a parallel printer port of a personal computer and an external printer, comprising:

a first data buffer, a signal receiving port for receiving an external signal for monitoring by the signal processing means, a signal converter connected to said signal receiving port and selectively connected to said first data buffer for producing data containing information about the external signal and for transferring said data into said first data buffer, including analog converter means for converting an analog external signal monitored at said signal receiving port to a first digital signal, printer control means for selectively interconnecting the parallel printer port of the personal computer to the input of an external printer, said printer control means selectively enabling one of at least two interconnect modes, including a transparent mode in which the parallel printer port of the personal computer is connected to the input of an external printer, enabling direct throughput of printer control instructions between the personal computer and the external printer, and a nontransparent mode in which the connection between the parallel printer port of the personal computer and the external printer is blocked, logic control means connected to said first data buffer and coupled to the personal computer through the parallel printer port, said logic control means being responsive to instructions from the personal computer for controlling the signal processing means including the printer control means, and an oscillator clock connected to said analog converter means and to said logic control means, in which said analog converter means converts the analog external signal to said first digital signal at intervals established by said oscillator clock, which intervals are determined by instructions supplied from the personal computer to said oscillator clock through said logic control means.

2. Signal processing means as in claim 1 in which said analog converter means is a voltage-to-frequency converter, including counter means connected to said voltage-to-frequency converter responsive to the output of said voltage-to-frequency converter for producing a count containing information about the analog signal monitored by said voltage-to-frequency converter for storage in said first data buffer.

3. Signal processing means as in claim 2 in which said voltage-to-frequency converter outputs up to an 16-bit pulse train as said first digital signal and said first data buffer is at least an 16-bit buffer.

4. Signal processing means as in claim 1 in which said analog converter means is a analog-to-digital converter.

5. A signal processor controlled by a personal computer for connection between the parallel printer port of a personal computer and the input of an external printer, the processor comprising:

a computer interconnect port including a plurality of pins for interconnection with compatible pins on the parallel printer port of a personal computer, one or more signal input ports at which one or more signals monitored by the signal processor are received, a signal converter connected to one said signal input port, a first data buffer connected to said signal converter, a printer interconnect port for interconnection with an external printer, and an address selector connected to said computer interconnect port and controlled by a personal computer connected thereto, said address selector also being connected to and including predetermined address codes therein for accessing other selected components of the signal processor, including said signal converter, said first data buffer, and said printer interconnect port, whereby a computer connected to said computer interconnect port accesses selected components through the computer interconnect port to retrieve information and control the signal processor, wherein said signal converter converts a signal monitored at said one or more signal input ports, in accordance with instructions from a personal computer, and produces a first digital signal containing information about the monitored signal, said first data buffer receives and stores information contained in said first digital signal for access and retrieval by a personal computer through said address selector, and said address selector selectively enables one of at least two interconnect modes in response to instructions from a personal computer, including, a transparent mode in which said computer interconnect port is connected to said printer interconnect port for direct throughput of printer control instructions between a personal computer and an external printer, and a nontransparent mode in which the connection between the address selector and computer interconnect port is blocked.

6. A signal processor as in claim 5 in which said signal converter is an analog-to-digital converter connected to one said signal input port at which an analog signal is monitored, said analog-to-digital converter being addressable through said address selector by a personal computer connected to said computer at said computer interconnect port for controlling the analog-to-digital conversion interval based on instructions from a personal computer.

7. A signal processor as in claim 6 in which said analog-to-digital converter is a voltage-to-frequency converter, the signal processor further including an oscillator clock connected to said address selector, said address selector further including predetermined address codes therein for accessing said oscillating clock as one of the selected components accessible by a personal computer connected to said computer interconnect port, the oscillator clock being connected to said voltage-to-frequency converter, wherein said oscillator clock operates at a predetermined frequency and is programmable in response to instructions from a personal computer to establish a digitizing cycle duration, said oscillator clock periodically resetting said first data buffer at intervals based on the digitizing cycle duration, and including a counter connected to said voltage-to-frequency converter and said first data buffer, said counter periodically accumulating a count containing information about a signal monitored at said one signal input port for transfer to said first data buffer.

8. A signal processor as in claim 7 in which said voltage-to-frequency converter outputs up to a 16-bit pulse train as said first digital signal and said first data buffer is at least a 16-bit buffer.

9. A signal processor as in claim 5 including a status buffer connected to one or more said signal input ports at which one or more digital status signals are monitored, said status buffer also being connected to said address selector which further includes predetermined address codes therein for accessing said status buffer as one of the selected components accessible by a personal computer connected to said computer interconnect port, said status buffer receiving and storing digital status information received at said one or more status signal input ports, which information is accessible by a personal computer through said address selector.

10. A signal processor as in claim 9 in which information stored in said status buffer is retrievable through said address selector by a personal computer connected to said computer interconnect port in 4-bit data nibbles, said status buffer having a capacity greater than 4-bits and individual 4-bit nibbles being addressable by a personal computer through said address selector until the entire status buffer has been read.

11. A signal processor as in claim 5 in which said first data buffer has a capacity exceeding 4-bits and said first data buffer is addressable by a personal computer through said address selector and said computer interconnect port in 4-bit data nibbles, whereby the information in said first data buffer is retrievable by a personal computer through said address selector by selectively addressing 4-bit data nibbles in said data buffer until the entire buffer has been read.

12. A signal processor as in claim 5 in which one or more of said signal input ports is a frequency input port connected to said first data buffer for monitoring one or more frequency input signals, wherein said first data buffer receives and stores information about said one or more frequency input signals for access and retrieval by a personal computer through said address selector.

13. A signal processor as in claim 12, including multiplexer means connected to said first data buffer, to said address selector, to said signal converter and to said frequency input port, wherein said multiplexer means provides a selectable data path between a selected one of said signal converter and said frequency input port at one end of the data path and said first data buffer at the other end of the data path, and said address selector includes a predetermined address code for accessing said multiplexer means as one of the selected components of the signal processor to determine the data path selected by said multiplexer means based on instructions from a personal computer connected to said computer interconnect port.

14. A signal processor as in claim 5 including one or more control signal output ports and an output signal buffer connected to said one or more signal output ports and also connected to said address selector, said address selector including predetermined address codes therein for accessing said output buffer as one of the selected components of the signal processor accessible by a personal computer connected to said computer interconnect port, said output buffer storing one or more digital control signals based on instructions from a personal computer for output through said one or more signal output ports.

15. A signal processor controlled by a personal computer for connection to the parallel printer port of a personal computer, comprising:
 a computer interconnect port including a plurality of pins for interconnection with compatible pins on the parallel printer port of a personal computer,
 one or more signal input ports at which one or more signals monitored by the signal processor are received,
 a signal converter connected to one said signal input port,
 a first data buffer connected to said signal converter, and
 an address selector connected to said computer interconnect port and controlled by a personal computer connected thereto, said address selector also being connected to and including predetermined address codes therein for accessing other selected components of the signal processor, including said signal converter and said first data buffer, whereby a computer connected to said computer interconnect port accesses selected components through the computer interconnect port to retrieve information and control the signal processor, and
 wherein said signal processor converts a signal monitored at said one or more signal input ports, in accordance with instructions from a personal computer, and produces a first digital signal containing information about the monitored signal, and said first data buffer receives and stores information contained in said first digital signal for access and retrieval by a personal computer through said address selector.

16. A signal processor as in claim 15 in which said signal converter is an analog-to-digital converter connected to one said signal input port at which an analog signal is monitored, said analog-to-digital converter being addressable through said address selector by a personal computer connected to said computer at said computer interconnect port for controlling the analog-to-digital conversion interval based on instructions from a personal computer.

17. A signal processor as in claim 16 in which said analog-to-digital converter is a voltage-to-frequency converter, the signal processor further including an oscillator clock connected to said address selector, the address selector further including predetermined address codes therein for accessing said oscillating clock as one of the selected components accessible by a personal computer connected to said computer interconnect port, said oscillator clock being connected to said voltage-to-frequency converter, wherein said oscillator clock operates at a predetermined frequency and is programmable in response to instructions from a personal computer to establish a digitizing cycle duration, said oscillator clock periodically resetting said first data buffer at intervals based on the digitizing cycle duration, and including a counter connected to said voltage-to-frequency converter and said first data buffer, said periodically accumulating a count containing information about a signal monitored at said one signal input port for transfer to said first data buffer.

18. A signal processor as in claim 17 in which said voltage-to-frequency converter outputs up to a 16-bit pulse train as said first digital signal and said first data buffer is at least a 16-bit buffer.

19. A signal processor as in claim 15 including a status buffer connected to one or more said signal input ports at which one or more digital status signals are monitored, said status buffer also being connected to said address selector which further includes predetermined address codes therein for accessing said status buffer as one of the selected components accessible by a personal computer connected to said computer interconnect port, said status buffer receiving and storing digital status information received at said one or more status signal input ports, which information is accessible by a personal computer through said address selector.

20. A signal processor as in claim 19 in which information stored in said status buffer is retrievable through said address selector by a personal computer connected to said computer interconnect port in 4-bit data nibbles, said status buffer having a capacity greater than 4-bits and individual 4-bit nibbles being addressable by a personal computer through said address selector until the entire status buffer has been read.

21. A signal processor as in claim 15 in which said first data buffer has a capacity exceeding 4-bits and said first data buffer is addressable by a personal computer through said address selector and said computer interconnect port in 4-bit data nibbles, whereby the information in said first data buffer is retrievable by a personal computer through said address selector by selectively addressing 4-bit data nibbles in said data buffer until the entire buffer has been read.

22. A signal processor as in claim 15 in which one or more of said signal input ports is a frequency input port connected to said first data buffer for monitoring one or more frequency input signals, wherein said first data buffer receives and stores information about said one or more frequency input signals for access and retrieval by a personal computer through said address selector.

23. A signal processor as in claim 22, including multiplexer means connected to said first data buffer, to said address selector, to said signal converter and to said frequency input port, wherein said multiplexer means provides a selectable data path between a selected one of said signal converter and said frequency input port at one end of the data path and said first data buffer at the other end of the data path, and said address selector includes a predetermined address code for accessing said multiplexer means as one of the selected components of the signal processor to determine the data path selected by said multiplexer means based on instructions from a personal computer connected to said computer interconnect port.

24. A signal processor as in claim 15 including one or more control signal output ports and an output signal buffer connected to said one or more signal output ports and also connected to said address selector, said address selector including predetermined address codes therein for accessing said output buffer as one of the selected components of the signal processor accessible by a personal computer connected to said computer interconnect port, said output buffer storing one or more digital control signals based on instructions from a personal computer for output through said one or more signal output ports.

* * * * *